US010008107B2

(12) United States Patent
Li

(10) Patent No.: US 10,008,107 B2
(45) Date of Patent: Jun. 26, 2018

(54) METHOD AND SURVEILLANCE SYSTEM FOR DETECTING UNWANTED INTRUSION BASED ON INTERACTIONS BETWEEN WIRELESS COMMUNICATION AND MONITORING DEVICES

(71) Applicant: Hao Li, London (CA)

(72) Inventor: Hao Li, London (CA)

( * ) Notice: Subject to any disclaimer, the term of this patent is extended or adjusted under 35 U.S.C. 154(b) by 470 days.

(21) Appl. No.: 14/604,708

(22) Filed: Jan. 24, 2015

(65) Prior Publication Data
US 2016/0217683 A1    Jul. 28, 2016

(51) Int. Cl.
| H04W 12/00 | (2009.01) |
| G08B 29/26 | (2006.01) |
| G06K 9/00 | (2006.01) |
| G08B 13/00 | (2006.01) |
| H04W 12/12 | (2009.01) |
| G08B 13/196 | (2006.01) |
| G08B 25/08 | (2006.01) |

(52) U.S. Cl.
CPC ......... *G08B 29/26* (2013.01); *G06K 9/00771* (2013.01); *G08B 13/00* (2013.01); *G08B 13/19602* (2013.01); *G08B 25/08* (2013.01); *H04W 12/12* (2013.01)

(58) Field of Classification Search
CPC combination set(s) only.
See application file for complete search history.

(56) References Cited

U.S. PATENT DOCUMENTS

| 4,347,590 A * | 8/1982 | Heger ............... G02B 7/40 340/691.1 |
| 6,778,084 B2 * | 8/2004 | Chang ............... G08B 25/10 340/504 |
| 7,109,861 B2 * | 9/2006 | Rao ............... G08B 21/0202 340/541 |
| 7,535,352 B2 * | 5/2009 | Sobol ............... G08B 13/19621 340/506 |

(Continued)

OTHER PUBLICATIONS

"FIMD: Fine-grained Device-free Motion Detection" by J. Xiao et al, IEEE International Conference on Parallel and Distributed Systems, Dec. 17-19, 2012, Singapore.*

(Continued)

*Primary Examiner* — Janese Duley

(57) ABSTRACT

A method and surveillance system are presented for detecting and alarming intrusions that are caused by unwanted people in a protected area, by exploiting interactions between the wireless communication and monitoring devices of the surveillance system but no special sensors. An intrusion in the protected area is primarily detected by analyzing the variation of the wireless channel observed at the wireless communication device, and further confirmed by images captured by the monitoring device, where the image capture can be triggered by the intrusion detection result. The threshold used to primarily determine the existence of an intrusion is self-calibrated by comparing the result of the channel-variation based intrusion detection with the findings of the captured images. Moreover, an intrusion caused by authorized people of the protected area is identified through checking the connection status of the secured wireless communication network in the protected area, and then filtered out.

5 Claims, 2 Drawing Sheets

(56) References Cited

U.S. PATENT DOCUMENTS

| | | | | |
|---|---|---|---|---|
| 7,679,507 B2* | 3/2010 | Babich | ............ | G08B 13/19684 |
| | | | | 340/506 |
| 9,869,759 B2* | 1/2018 | Furuskog | ................ | G01S 13/04 |
| 2011/0102588 A1* | 5/2011 | Trundle | ............... | G08B 13/196 |
| | | | | 348/143 |
| 2015/0326610 A1* | 11/2015 | Bartoszewski | ..... | H04L 41/0813 |
| | | | | 726/1 |

OTHER PUBLICATIONS

"An unmanned watching system using video cameras" by K. Kaneda et al, IEEE Computer Applications in Power, pp. 20-24, Apr. 1990.*

\* cited by examiner

METHOD AND SURVEILLANCE SYSTEM FOR DETECTING UNWANTED INTRUSION BASED ON INTERACTIONS BETWEEN WIRELESS COMMUNICATION AND MONITORING DEVICES

CROSS-REFERENCE TO RELATED APPLICATIONS

Not Applicable.

BACKGROUND OF THE INVENTION

Field of the Invention

This invention is directed to a method and surveillance system for detecting unwanted intrusion into a protected area using wireless communication and monitoring devices, and more particularly to a method and surveillance system that performs intrusion detection, system self-calibration and detected object classification.

Description of the Related Art

Current trends appear to indicate that surveillance systems for residential and/or commercial buildings are more and more intelligent. In cooperation with special sensors like intrusion detectors, surveillance systems can sense the existence of an intruder so as to trigger the image capture or video recording of the camera. As a result, the power consumption of the surveillance system and the amount of data to be stored by the system can be effectively reduced. Also, some special sensors may be able to help surveillance systems to calculate the distance from the camera to the intruder, which would facilitate focusing the camera objective on the intruding subject. Meanwhile, surveillance systems have been coupled with communication systems, in particular wireless communication systems, to provide an instantaneous status update of the monitored area to the property owner. Based on this real-time communication, the property owner is able to verify whether there is an actual intrusion into the protected area and then to make an appropriate response with respect to the detection of the surveillance system.

U.S. Pat. No. 4,347,590 disclosed an area surveillance system which used an ultrasonic intrusion detector to determine the presence of an intruder and an electronic range finder to focus the camera objective on the intruding subject. An automatic monitoring and sensing apparatus has been disclosed in U.S. Pat. No. 7,109,861B2, in which special sensors like the infrared sensor and motion detector were exploited to determine the existence of an intruder for the surveillance system. As such, special sensors must be included in the surveillance system, leading to additional cost in the manufacture and additional power consumption in the system operation.

In order to reduce false alarms in surveillance systems, real-time communication between the surveillance system and property owner has been introduced. The cooperation between the monitoring device and communication device, in particular the wireless communication device, has emerged. In U.S. Pat. No. 6,778,084 B2, a surveillance and security system with a remote command unit has been disclosed. The system component in that invention was configured to perform an examination of the premises and to send a corresponding surveillance signal to the command unit. The property owner could thus obtain the updated surveillance result and make responses using the remote command unit. U.S. Pat. No. 7,535,352 B2 disclosed a security system with an electronic control unit that was programmed to send captured photographs to pre-programmed telephone numbers upon detection of an intruder. Similarly, in the disclosed video alarm verification technique in U.S. Pat. No. 7,679,507B2, detected alarm events would be sent to the end-user through his cell phone and the end-user could then use the cell phone's key to verify the events. A significant disadvantage of these inventions is that the property owner may continuously receive false alarms from the surveillance systems as any detected events would be sent to the property owner, without verifying whether the detected events are caused by an actual intruder or an authorized people in the protected area.

An improved security system which attempted to avoid false alarms caused by authorized people in a protected area was disclosed in U.S. Pat. No. 7,109,861B2. An image processing technique: the face recognition technique, was exploited in that invention to identify whether the detected object is an authorized people in the protected area in order to reduce false alarms. With the purpose of a reliable face recognition, a high-resolution camera and a powerful signal processing unit would be required, leading to a high production cost.

BRIEF SUMMARY OF THE INVENTION

To that end, a method and system that can detect unwanted intrusions into a protected area without relying on any special sensors is provided. The present invention takes advantage of interactions between the wireless communication device and monitoring device in a surveillance system to perform the intrusion detection, system self-calibration and detected object classification operations.

One embodiment of this invention is to explore the variation of the wireless channel between the surveillance system and access point (AP) of the wireless communication network in the protected area to primarily realize the intrusion detection. This processing is based on the general packet transmission from the AP of the wireless communication network to the wireless communication device of the surveillance system, without relying on any special sensors or any special packet transmission. In the present invention, the surveillance system is connected to a secured wireless local area network (WLAN) in the protected area, such as a secured Wi-Fi network. The wireless communication device of the surveillance system would thus hear packets broadcasted by the AP of the WLAN regularly. Consider the fact that any motion in the environment of a wireless communication network would lead to a variation of the wireless channel between the transmitter and receiver. A significant variation of the wireless channel would thus be induced by an intrusion into the protected area. Therefore, an intrusion can be detected by observing the wireless channel or alternatively any parameters of the received signals that are determined by the wireless channel such as the received signal strength. The detection result would then trigger the camera to capture the image or to record the video. Without a positive intrusion detection result, the camera only captures an image after a predefined time interval.

Another embodiment of this invention is to provide a self-calibration mechanism for the channel-variation based intrusion detection. In order to determine whether the variation of the wireless channel observations is caused by an intrusion or other factors like channel estimation errors, the variation of the wireless channel observations is compared with a predefined threshold. Detection of an intrusion is determined only if the variation is larger than the threshold. There is a fact that the threshold highly depends on the environment of the protected area. Even a small change of the environment, like a new chair is placed in the protected area, may ask for an adjustment of the threshold. Therefore, the threshold should be calibrated frequently. In the disclosed invention, any detection that is reported by the channel-variation based intrusion detection would be further confirmed by the captured image. Once the operation of the camera is triggered by a positive intrusion detection result, the currently captured image will be compared with the last captured image to verify whether there is any intruder in the protected area. If there is a different result from the image analysis, the threshold for the channel-variation based intrusion detection would be automatically adjusted until the channel-variation based intrusion detection and the subsequent image analysis give the same result.

A further object of this invention is to identify whether the detected event is caused by any authorized people of the protected area to reduce false alarms, through checking the connection status of the secured wireless communication network in the protected area. Once the image analysis of the present invention also determines the existence of an intrusion, the wireless communication device of the surveillance system would ask for an update of the network connection status, such as the network routing table, from the AP of the secured wireless network to check whether there is any device just joined the communication network in the protected area. Nowadays people usually take some portable consumer devices like smartphones and tablets along with them. These consumer devices can automatically connect to a wireless communication network if they are authorized to access the network. Generally, the authorized people in a protected area can have access to the secured wireless communication network in that area, so that their devices would automatically connect to the secured wireless communication network once they are in the protected area. As a result, the existence of a new device in the secured wireless communication network in a protected area usually indicates that the owner of this device who just gets into the protected area is not an unwanted people in the protected area. The alarm caused by this scenario would be a false alarm and can be disabled.

DETAILED DESCRIPTION OF THE INVENTION

The present invention now will be described more fully hereinafter with reference to the accompanying drawings, in which preferred embodiments of the invention are shown.

Figure 1:
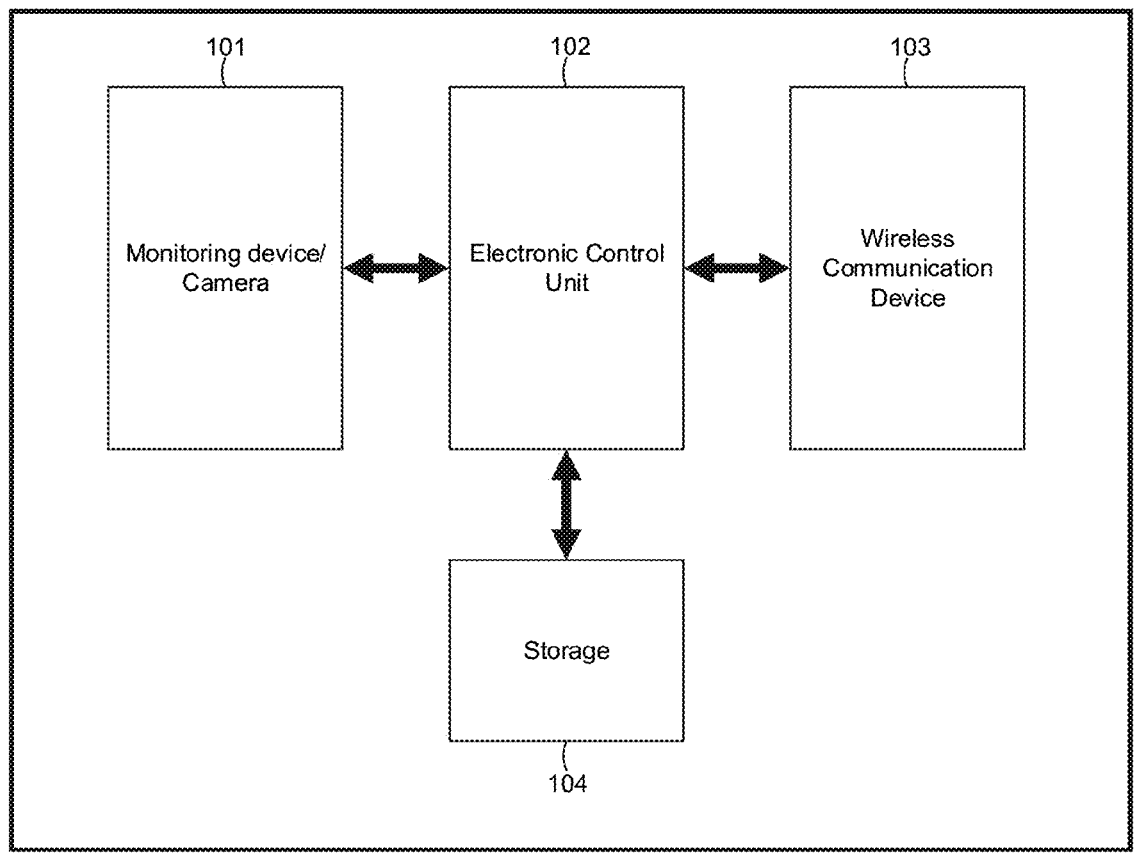
FIG. 1 illustrates the structure of the present invention that comprises at least a monitoring device/camera, a communication device, an electronic control unit and a storage.

FIG. 1 describes the overall architecture of the invention. The present surveillance system comprises four modules: monitoring device/camera 101, electronic control unit 102, wireless communication device 103, and storage 104. The monitoring device/camera 101 would capture the image of the protected area based on the request from the electronic control unit 102. The electronic control unit 102 conducts the data analysis for the surveillance system based on the inputs from the monitoring device/camera 101 and the wireless communication device 103. Meanwhile, electronic control unit 102 controls the operation of the other modules in the system. The wireless communication device 103 is responsible for the communication between the surveillance system and wireless communication network in the protected area. Also, the wireless communication device 103 would provide its observed wireless channel condition to the electronic control unit 102. The wireless communication device 103, for instance, a Wi-Fi card, joins the secured WLAN in the protected area and works as a station in the WLAN. The storage 104 is used to save the temporary image captured by the monitoring device/camera 101 and parameters that are used for the data processing in the electronic control unit 102.

Figure 2:
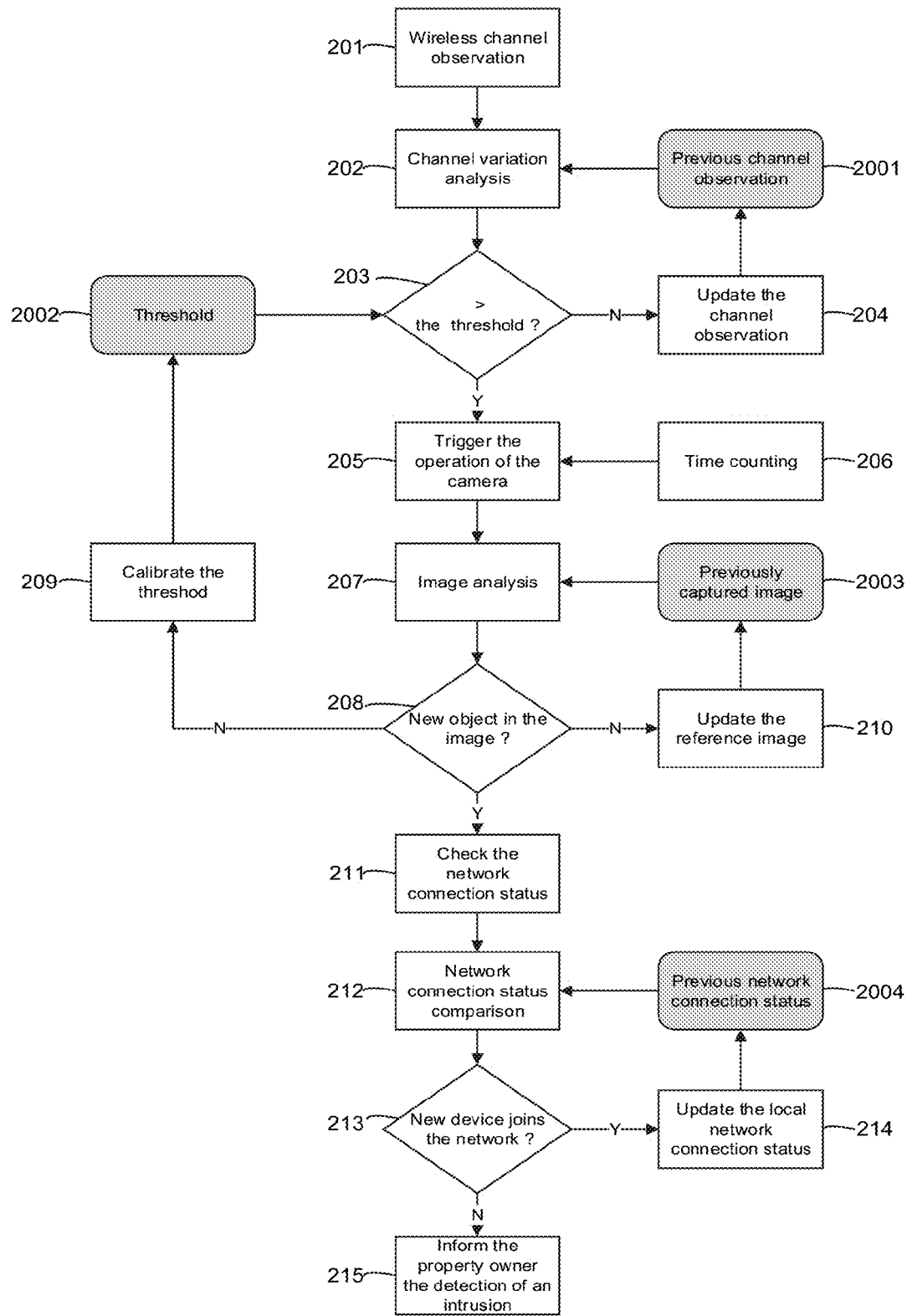
FIG. 2 shows the flowchart of the operation in the invention wherein the smart surveillance system operates with the interactions between its communication and monitoring devices.

The inventive surveillance system is now described in more detail, as shown in FIG. 2. The processing stage 201 is completed by the wireless communication device 103 based on the general packet transmission from the AP of the wireless communication network in the protected area, to the wireless communication device 103. In a WLAN, the AP would regularly send out broadcast packets to indicate its existence. Therefore, when there is no particular data transmission between the AP and the wireless communication device 103 of the surveillance system, the wireless communication device 103 still continuously receives packets from the AP. As a result, the wireless communication device 103 can have a real-time information of the channel condition between the AP and itself. When an intruder gets into the protected area, the channel condition changes. This can be easily figured out by the wireless communication device 103 from its channel estimation or the analysis of the received signals. For example, there would be a big fluctuation of the signal strength of received signals when a people walk into the protected area, as demonstrated in "FIMD: Fine-grained Device-free Motion Detection" by J. Xiao et al, IEEE International Conference on Parallel and Distributed Systems, Dec. 17-19, 2012, Singapore.

The estimate of the channel condition at the wireless communication device 103 is forwarded to the electronic control unit 102. The electronic control unit 102 would then calculate the difference between the current channel observation and the previous channel observation 2001 at the processing stage 202. After that, it compares the channel condition variation with a predefined threshold 2002 at the processing stage 203. If the variation is larger than the threshold 2002, the electronic control unit 102 would trigger the operation of the camera 101 at the processing stage 205. Otherwise, the electronic control unit 102 only updates the reference that is used for the channel variation analysis, i.e. the previous channel observation 2001, at the processing stage 204.

The operation of the monitoring device/camera 101 in the inventive surveillance system is triggered by either a positive result from the processing stage 203 or the time counting result at the processing stage 206. More specifically, if a big variation of the wireless channel condition between the surveillance system and AP is observed, which indicates the existence of an intruder in the protected area, the electronic control unit 102 would send commands to the monitoring device/camera 101 and then enable its image capture at the processing stage 205. Meanwhile, if the monitoring device/camera 101 does not capture any image after a predefined time interval, the electronic control unit 102 would also trigger the image capture of the monitoring device/camera 101 at the processing stage 205, based on the time counting result from the processing stage 206.

Once a new image is captured, at the processing stage 207, the electronic control unit 102 would compare the new image with the reference image 2003 that was previously captured. By employing the image processing techniques, like "An unmanned watching system using video cameras" by K. Kaneda et al, IEEE Computer Applications in Power, pp. 20-24, April 1990, whether there is an object getting into the protected area would be further determined at the processing stage 208. If there is no new object in the captured image, it indicates that the channel-variation based intrusion detection cannot guarantee a correct detection. The electronic control unit 102 would then calibrate the threshold 2002 at the processing stage 209, until the channel-variation based intrusion detection and the subsequent image comparison give the same result. A self-calibration of the threshold for the channel-variation based intrusion detection is then achieved. Meanwhile, the surveillance system would update the reference image 2003 at the processing stage 210. On the other hand, if the image comparison result confirms the existence of an intrusion in the protected area, the electronic control unit 102 would then further determine whether the detected object is an authorized people in the protected area or not.

In order to determine whether the detected object is an authorized people in the protected area, the electronic control unit 102 would ask the wireless communication device 103 to require an up-to-date connection status of the secured wireless communication network in the protected area, from the AP of the network. This happens at the processing stage 211. Nowadays, almost every people carries some portable consumer devices such as smartphones, tablets and e-readers. Generally, these devices have the capability to connect to WLANs like a Wi-Fi network. For an authorized people in a protected area, like a family member of a house, his/her devices would be able to join the secured WLAN there. More typically, these authorized consumer devices would automatically connect to the secured wireless communication network once they are in the coverage of the network. As a result, the existence of a new device in the secured wireless communication network in a protected area can indicate that an authorized people just gets into the protected area. Therefore, when an intrusion is detected in the protected area, the electronic control unit 102 can classify whether this intrusion is caused by an authorized people or not, by checking whether there is any new device that just joins the secured wireless communication network in the protected area.

A comparison between the up-to-date network connection status of the secured wireless communication network in the protected area and the previous network connection status 2004 is conducted at the processing stage 212. Following it, whether there is a new device joining the secured wireless communication network in the protected area is determined at the processing stage 213. If no device just joins the secured WLAN in the protected area, the detected intrusion should not be caused by an authorized people. An unwanted intrusion is detected and an alarm should be issued. The electronic control unit 102 would send a warning message or email with the captured image to the property owner at the processing stage 215. Otherwise, there is a high probability that the detected object is an authorized people in the protected area. The electronic control unit 102 only needs to locally update the network connection status at the processing stage 214. No alarm will be sent to the property owner.

What is claimed is:

1. A method comprising:
   a) initiating intrusion detection into a protected area based on channel variation information using a secured wireless communication network and wireless communication device of a surveillance system;
   b) detecting existence of an intrusion in the protected area by channel variation of the wireless communication device, which is obtained from general packet transmission from AP of connected network to the wireless communication device;
   c) triggering image capture of a monitoring device in accordance to detected event of channel-variation based intrusion detection or a scheduled image capture after a predefined time interval;
   d) conducting image analysis after each image capture to confirm the intrusion detected by the channel-variation based intrusion detection;
   e) self-calibrating decision threshold in the channel-variation based intrusion detection in accordance to the captured image; and
   f) checking connection status of the secured wireless communication network in the protected area to identify whether the intrusion is caused by an unwanted or authorized people in the protected area.

2. The method according to claim 1, wherein the wireless communication device of the surveillance system is connected to the secured wireless communication network in the protected area accessed only by authorized people in the protected area.

3. The method according to claim 2, wherein the wireless communication network is used for a real-time transmission of the intrusion detection in the protected area to property owner.

4. The method according to claim 1, wherein the decision threshold in the channel-variation based intrusion detection is self-calibrated until the image captured by the monitoring device confirms the channel-variation based intrusion detection.

5. The method according to claim 1, wherein the intrusion is classified as caused by authorized people when a new device is identified in the secured wireless communication network; and if it is not determined to be caused by the authorized people, issuing an alarm.

* * * * *